(12) United States Patent
Chao et al.

(10) Patent No.: US 8,988,559 B2
(45) Date of Patent: Mar. 24, 2015

(54) ELECTRONIC DEVICE

(71) Applicant: Ability Enterprise Co., Ltd., Taipei (TW)

(72) Inventors: Chun-Hsiung Chao, Taipei (TW); Chin-Nan Chen, Taipei (TW)

(73) Assignee: Ability Enterprise Co., Ltd., Taipei (TW)

(*) Notice: Subject to any disclaimer, the term of this patent is extended or adjusted under 35 U.S.C. 154(b) by 45 days.

(21) Appl. No.: 13/751,857

(22) Filed: Jan. 28, 2013

(65) Prior Publication Data

US 2013/0208145 A1 Aug. 15, 2013

(30) Foreign Application Priority Data

Feb. 14, 2012 (TW) .............................. 101104665 A

(51) Int. Cl.
| | |
|---|---|
| *H04N 5/262* | (2006.01) |
| *H04N 5/222* | (2006.01) |
| *G03B 7/00* | (2014.01) |
| *H04N 5/235* | (2006.01) |

(52) U.S. Cl.
CPC ........... *H04N 5/2621* (2013.01); *H04N 5/2354* (2013.01); *H04N 5/2355* (2013.01)
USPC ........ 348/239; 348/371; 348/220.1; 348/363; 348/372; 396/63; 396/65; 396/61; 396/155

(58) Field of Classification Search
CPC ....... H04N 5/262; H04N 5/228; H04N 5/225; H04N 5/222; H04N 5/235; G03B 15/02; G03B 15/03; G03B 9/70
USPC ........... 348/220.1, 362, 371, 372, 222.1, 239; 396/61, 171, 173, 177, 155, 157, 159, 396/166, 167, 182, 68, 70, 131, 132, 258, 396/261, 370, 63, 65
See application file for complete search history.

(56) References Cited

U.S. PATENT DOCUMENTS

| | | | | |
|---|---|---|---|---|
| 7,295,720 | B2 * | 11/2007 | Raskar et al. ................. | 348/312 |
| 7,443,443 | B2 * | 10/2008 | Raskar et al. ................. | 348/370 |
| 7,457,477 | B2 * | 11/2008 | Petschnigg et al. ........... | 382/274 |
| 7,583,297 | B2 * | 9/2009 | Yamada et al. ............ | 348/223.1 |
| 2008/0131007 | A1 * | 6/2008 | Kutka ........................... | 382/232 |

* cited by examiner

*Primary Examiner* — Tuan Ho
*Assistant Examiner* — Marly Camargo
(74) *Attorney, Agent, or Firm* — Rabin & Berdo, P.C.

(57) ABSTRACT

An electronic device includes a flash unit, an image sensor and a computing unit. The image sensor captures at least one first image and a second image, and captures a third image with the flash unit. The computing unit mixes the first images and the second image to form a mixed image. Besides, the computing unit integrates the mixed image and the third image to form an integrated image.

14 Claims, 2 Drawing Sheets

ELECTRONIC DEVICE

This application claims the benefit of Taiwan application Serial No. 101104665, filed Feb. 14, 2012, the subject matter of which is incorporated herein by reference.

BACKGROUND OF THE INVENTION

1. Field of the Invention

The invention relates in general to an electronic device, and more particularly to an electronic device for enhancing image quality.

2. Description of the Related Art

Functions provided by digital cameras become more diversified in order to satisfy various user needs. Particularly for high-end cameras, a handheld night portrait function is one of the most important appraisals of digital cameras.

Handheld night shooting generally captures images under long-term exposure that leads to an increased ISO value. Thus, not only object positions in the images are prone to alignment inconsistency due to wavering during a process of handheld night shooting, but also the images captured are likely to have larger noises.

Therefore, there is a need for an image processing method and an electronic device for mitigating the alignment inconsistency, so as to render high-quality photographs in an environment of insufficient light without a tripod to optimize market and product competitiveness.

SUMMARY OF THE INVENTION

The invention is directed to an image processing method and an electronic device for effectively enhancing quality of captured images and thus optimizing product competitiveness in the market.

According to an embodiment of the present invention, an electronic device is provided. The electronic device includes a flash unit, an image sensor and a computing unit. The image sensor captures at least one first image and a second image, and captures a third image with the flash unit. The computing unit mixes the first images and the second image to form a mixed image, and further integrates the mixed image with the third image to form an integrated image.

According to another embodiment of the present invention, an electronic device including a computing unit is provided. The computing unit combines at least one first image with a second image in accordance with the second image to form a mixed image, and synthesizes the mixed image with a third image to define an integrated image. The third image is captured with an assistance of a flash.

According to still another embodiment of the present invention, an electronic device is provided. The electronic device includes an image sensor and a computing unit. The image sensor provides a plurality of first images, a second image and a third image. The computing unit sequentially performs combining procedures on the first images to the second image to form a mixed image, and performs an integration procedure to synthesize the mixed image and the third image to provide an integrated image.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
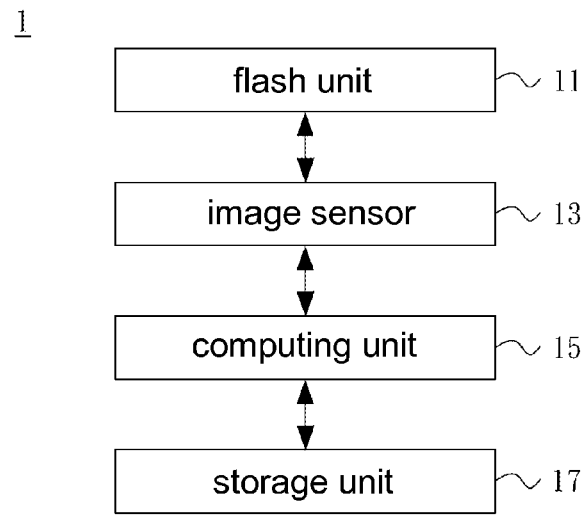
FIG. 1 is a block diagram of an imaging device according to an embodiment of the present invention.

FIG. 1 shows a block diagram of an electronic device according to an embodiment of the present invention. For example, the electronic device may be an imaging device 1 with image capturing functions, such as a camera, video camera, cell phone, personal digital assistant, digital music player, network camera or an image capturing and test system. Further, the present invention may also be applied to an electronic device having image processing capabilities.

Referring to FIG. 1, in this embodiment, the imaging device 1 includes a flash unit 11, an image sensor 13, a computing unit 15 and a storage unit 17. The image sensor 13 converts optic signal to electric signal. More specifically, the image sensor 13 may be a charge coupling element or a complementary metal oxide semiconductor (CMOS) image sensor.

The computing unit 15, coupled to the image sensor 13, performs predetermined image processing on an initial image captured by the image sensor 13. The storage unit 17, coupled to the computing unit 15, stores a processed image from the computing unit 15 or other pre-stored images. More specifically, for example, the computing unit 15 may be a central processing unit (CPU), a digital signal processor (DSP) or a graphics processing unit (GPU), and is not limited there to. For example, the storage unit 17 may be a built-in memory device in the imaging device 1, or a removable memory device such as a flash memory, and is not limited there to.

Figure 2:
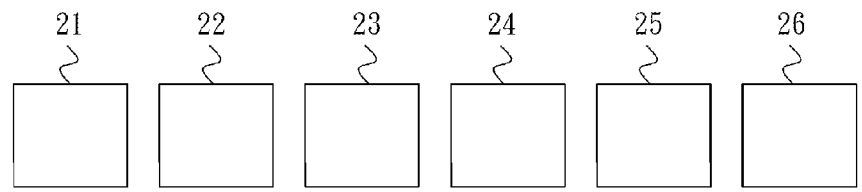
FIG. 2 is images continuously captured by an image sensor.

FIG. 2 shows images continuously captured by the image sensor 13 with respect to a scene. Please referring to FIGS. 1 and 2, in this embodiment, the image sensor 13 first successively exposes at least two images captured without the assistance of the flash unit 11. In this embodiment, five sequentially captured images 21 to 25 are taken as an example, with the four images 21 to 24 defined as first images, and the last image 25 defined as a second image. In an alternative embodiment, the image sensor 13 may capture one first image and one second image. The two images (the first image and the second image) are captured without the flash unit 11.

In practice, the second image may also be any one of the images 21 to 25, and image other than the second image among the images 21 to 25 is defined as the first image. Further, after having captured five images 21 to 25, the image sensor 13 captures a third image 26 jointed with the flash unit 11. In this embodiment, the capturing sequence as shown in FIG. 2.

In one embodiment, the images 21 to 25 and the third image 26 may be temporarily stored in the storage unit 17. Further, the third image 26 captured with the assistance of the flash unit 11 refers to an image captured given that the flash unit 11 is activated; the images 21 to 25, i.e., the first images and the second image, refer to images captured when the flash unit 11 is inactivated.

In another embodiment, the images 21 to 25 and the third image 26 may be alternately obtained, or the images 21 to 25 are captured after capturing the third image 26. The capturing sequence is not limited to capturing the images 21 to 25 before capturing the third image 26.

In another embodiment, the third image 26 may be a next image captured after capturing the second image. Alternatively, the second image may be a next image captured after capturing the third image 26. In other words, the second image and the third image 26 may be successively obtained, for example.

Again referring to FIGS. 1 and 2, the computing unit 15 receives the first images and second image captured by the image sensor 13, and sequentially performs image synthesis on the first images according to the second image. In an embodiment, the computing unit 15 defines the image 25 as the second image, and performs a mixing procedure according to the image 25 as a reference to sequentially align the images 21 to 24 with the image 25 to output a mixed image. For example, the images 21 to 24 are defined as the first images.

In an embodiment, the computing unit 15 may compare positions and/or outlines of objects (e.g., persons) in respective first images and the second image and perform an addition operation to sequentially superimpose the first images onto the second image.

In another embodiment, the computing unit 15 may compare a part or all of the pixels parameters of the second image and the first images to obtain relative positions and/or outlines of objects in the second image and the first images. The superimposition of the first images and the second image may be accumulating the pixel parameters of the first images to the pixel parameters of the second image. For example, the pixel parameters may be luminance values of the pixels of the first images and second image, and is not limited thereto.

In another embodiment, the computing unit 15 may compare every frame of the first images and a frame of the second image to determine displacement values of respective first images and the second image base on the second image.

In addition to the addition operation that sequentially adds the first images and the second image to generate a mixed image in the synthesis step, a mean operation may also be performed on the first images and the second image to generate a mixed image in another embodiment. More specifically, in the step of the combining procedure, after adding the pixel parameters of the pixels of the first images and the second image and gain an accumulated pixel parameters, the computing unit 15 also calculates a mean of the accumulated pixel parameters to obtain the pixel parameters of the pixels of the mixed image. For example, for the five images 21 to 25, the accumulated pixel parameters are obtained through an addition operation and the accumulated pixel parameters is divided by five to obtain the mean.

In another embodiment, weightings in the mean operation can be set according to arrangement orders of the first images and the second image. For example, the first image adjacent to the second image is assigned with a greater weighting, or else is assigned with a smaller weighting. In another embodiment, the weightings in the mean operation can be set according to arrangement orders of the first images, the second image and the third image 26. For example, the first image and/or the second image adjacent to the third image 26 is assigned with a greater weighting, or else is assigned with a smaller weighting. In one practice, the third image 26 may be a last image and may be successively captured after capturing the second image. That is, for example, the second image is a second last image, and is not limited thereto.

Further, due to an exposure period from starting the capturing of the image 21 to completing the capturing of the image 25 may be rather lengthy, noticeable displacements between the images 21 and 25 may be resulted which come from wavering or moving objects in the captured scene during the exposure period.

In an embodiment, a threshold is determined for the mixing procedure, and the computing unit 15 also respectively calculates displacements of the first images base on the second image before mixing the first images and the second image. When the displacement of the currently compared first image is greater than the predetermined threshold, it means that the displacement between the currently compared first and second images is too large such that the currently compared first may not be synthesized to the second image.

In an embodiment, regarding the second image as a reference, the computing unit 15 may perform the mixing procedure on the first and second images when the displacement of the first image is not greater than the predetermined threshold. In one more embodiment, defining the image 21 to 24 as the first images and the image 25 as the second image. After the computing unit 15 respectively compares the second image with the images 21 to 24, if it is confirmed that the displacement between the image 22 and the second image is greater than the threshold and the displacements between the images 21, 23 and 24 and the second image are not respectively greater than the threshold, the computing unit 15 adopts only the images 21, 23 and 24 to be synthesized with the second image. In other words, among the five images 21 to 24, for any image having one or more displacements greater than the threshold from the second image, the computing unit 15 does not adopt the corresponding image(s) for the mixing procedure.

In generally, the third image 26 is captured under activating flash unit 11, so that a clearer third image 26 can still be obtained with a shorter exposure period than the exposure period of the images 21 to 25. In an embodiment, after generating the mixed image by the images 21 to 25, the computing unit 15 may perform an integration procedure for integrating the mixed image and the third image 26 to form an integrated image.

In another embodiment, the computing unit 15 may integrate the mixed image and the third image 26 through another mean operation or addition operation to form the integrated image, and output the integrated image to the storage unit 17 for storing. Further, according to a user command or a built-in procedure, the integrated image is displayed on a display panel (not shown). For example, the computing unit 15 may perform a mean or addition operation on pixel parameters of corresponding pixels of the mixed image and the third image 26 to generate pixel parameters of pixels in the integrated image. For example, the pixel parameter may be luminance values of the pixels of the mixed image and third image, and is not limited thereto.

In another embodiment, the mean operation may be a weighted mean operation. For example, a weighting of the third image 26 may be set to be greater than a weighting of the mixed image, or vice versa.

Figure 3:
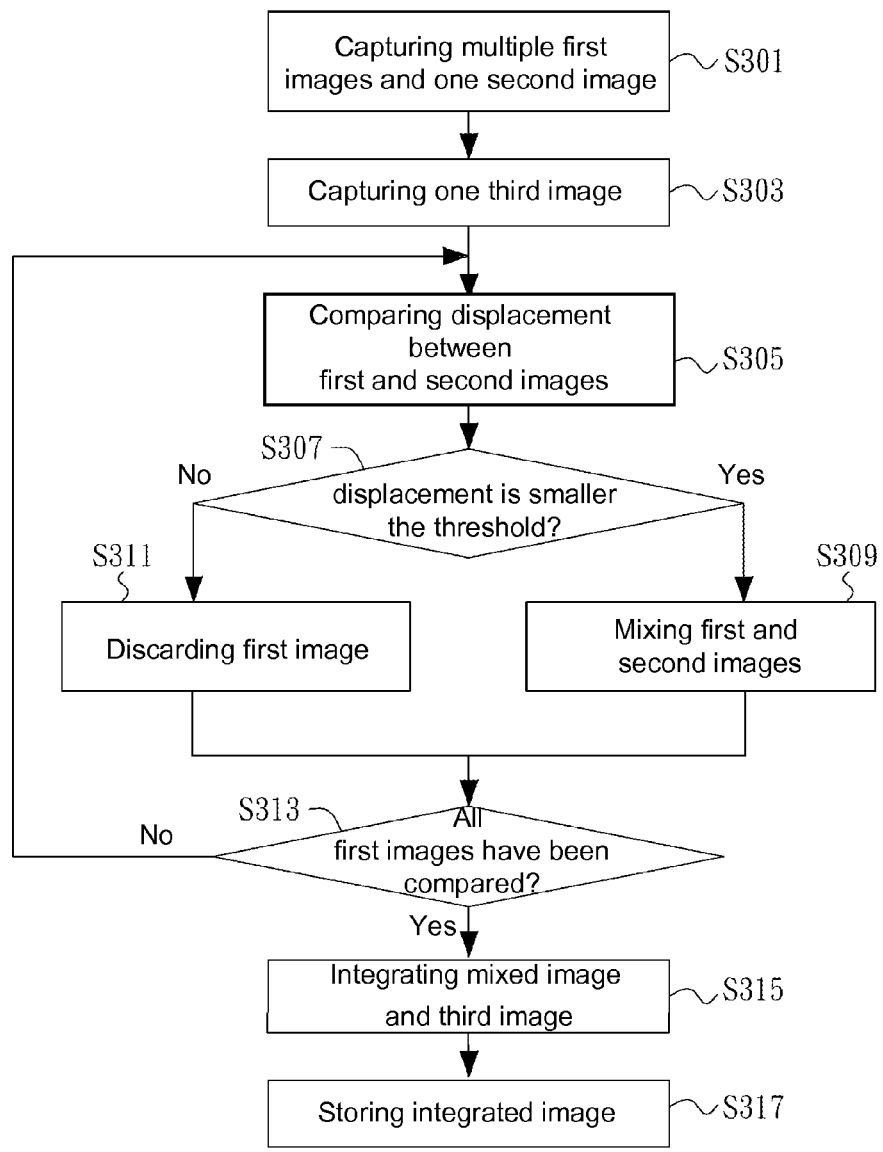
FIG. 3 is a flowchart of an image processing method according to an embodiment of the present invention.

FIG. 3 shows a flowchart of an image processing method according to an embodiment of the present invention. The image processing method is applicable to the imaging device 1 in FIG. 1 as well as to other systems having image processing capabilities. The image processing method is described in detail below also with reference to FIGS. 1 and 2.

Referring to FIG. 3. Firstly, in step S301, the image sensor 13 continuously exposes a plurality of first images and the second image captured without activating the flash unit 11. In step S303, the flash unit 11 is activated, and a third image 26 is captured in the same scene with assistance of a flash. In step S305, the computing unit 15 performs a mixing procedure and sequentially compares displacements between respective first images and the second image. In step S307, it is respectively determined whether the displacements are smaller than the predetermined threshold.

In step S311, when a determination result of step S307 is negative, it means that the displacement between the currently compared first and second images is greater than the predetermined threshold. In other words, the displacement between the current first and second images is too large to be adopted, and so the first image is discarded. When the determination result of step S307 is affirmative, step S309 is performed, in which the computing unit 15 performs the mixing procedure on the currently compared first and second images.

In step S313, the computing unit 15 determines whether all of the first images have been compared. If not, the process iterates step S305 to continue the comparison. When all of the first images have been compared, the mixing procedure is performed on the second image and the first images that satisfying the requirement to form the aligned mixed image. In step S315, the computing unit 15 performs an integration procedure to integrate the mixed image and the third image 26 to form an integrated image. In step S317, the integrated image is transmitted to the storage unit 17 and stored therein.

With the above embodiments, it is demonstrated that in the image processing method and the imaging device 1 of the present invention, for example, a last image serves as a reference for mixing the remaining images, and the invention is not limited thereto. In an alternative embodiment, the computing unit 15 may be used to first determine and select a preferred image as a mixing reference, or a predetermined image for serving a mixing reference is configured in advance in the imaging device 1. Thus, compared to a conventional image alignment mechanism, the image processing method and the imaging device of the present embodiments of the invention effectively mitigates the alignment inconsistency for handheld night shooting to provide enhanced image quality.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electronic device, comprising:
   a flash unit;
   an image sensor, capturing a plurality of first images and a second image, and capturing a third image with the flash unit; and
   a computing unit, mixing the first image and the second image to form a mixed image, and integrating the mixed image and the third image to form an integrated image;
   wherein the computing unit respectively compares displacements of the first images based on the second image and performs a mean, weighted mean or addition operation on the second image and the first images to form the mixed image while the displacement is smaller than a threshold.

2. The electronic device according to claim 1, further comprising a storage unit, the integrated image being stored by the storage unit.

3. The electronic device according to claim 1, wherein the computing unit performs the mean, weighted mean or addition operation on the mixed image and the third image to define the integrated image.

4. An electronic device, comprising:
   a computing unit, mixing a plurality of first images and a second image in accordance with the second image to form a mixed image, and synthesizing the mixed image with a third image to define an integrated image; and
   a storage unit, storing the first image, the second image and the integrated image;
   wherein, the third image is captured with a flash, and the computing unit respectively compares a displacement of the first images based on the second image and performs a mean, weighted mean or addition operation on the second image and the first images to form the mixed image while the displacement is smaller than a threshold.

5. The electronic device according to claim 4, wherein the first images and the second image are captured without the flash.

6. The electronic device according to claim 4, further comprising an image sensor to capture the first images, the second image and the third image.

7. The electronic device according to claim 4, wherein the flash is provided by the flash unit.

8. The electronic device according to claim 4, wherein the computing unit performs the mean, weighted mean or addition operation on pixel parameters of the first images and the second image.

9. The electronic device according to claim 4, wherein the computing unit performs the mean, weighted mean or addition operation on the mixed image and the third image to define the integrated image.

10. The electronic device according to claim 9, wherein the computing unit performs the mean, weighted average or addition operation on pixel parameters of the mixed image and the third image.

11. An electronic device, comprising:
    an image sensor, providing a plurality of first images, a second image and a third image; and
    a computing unit, sequentially performing combining procedures on the first images to the second image to form a mixed image, and performing an integration procedure to synthesize the mixed image and the third image to provide an integrated image;
    wherein the combining procedures comprise respectively calculating each displacement of the first images based on the second image and performing a mean, weighted mean, or addition operation on the second image and at least one of the first images while the corresponding displacement is smaller than a threshold.

12. The electronic device according to claim 11, wherein the combining procedures respectively perform the mean, weighted mean or addition operation with pixel parameters of the first images and the second image.

13. The electronic device according to claim 11, wherein the integration procedure comprises performing the mean, weighted mean or addition operation on the mixed image and the third image.

14. The electronic device according to claim 11, further comprising a flash unit that captures the third image for the image sensor.

* * * * *